US011563508B1

(12) United States Patent
Xu et al.

(10) Patent No.: US 11,563,508 B1
(45) Date of Patent: Jan. 24, 2023

(54) PHOTONICS ASSISTED MILLIMETER-WAVE SYSTEMS AND METHODS

(71) Applicant: CABLE TELEVISION LABORATORIES, INC., Louisville, CO (US)

(72) Inventors: Mu Xu, Broomfield, CO (US); Ruoyu Sun, Westminster, CO (US); Balkan Kecicioglu, Erie, CO (US); Junwen Zhang, Broomfield, CO (US); Haipeng Zhang, Broomfield, CO (US); Zhensheng Jia, Superior, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/498,442

(22) Filed: Oct. 11, 2021

Related U.S. Application Data

(63) Continuation of application No. 17/008,548, filed on Aug. 31, 2020, now Pat. No. 11,146,351.

(60) Provisional application No. 62/893,627, filed on Aug. 29, 2019.

(51) Int. Cl.
*H04J 14/02* (2006.01)
*H04Q 11/00* (2006.01)
*H04B 10/11* (2013.01)
*H04B 10/2575* (2013.01)

(52) U.S. Cl.
CPC ............ *H04J 14/023* (2013.01); *H04B 10/11* (2013.01); *H04B 10/2575* (2013.01); *H04J 14/0212* (2013.01); *H04Q 11/0005* (2013.01); *H04Q 2011/0015* (2013.01); *H04Q 2011/0016* (2013.01); *H04Q 2011/0039* (2013.01)

(58) Field of Classification Search
None
See application file for complete search history.

(56) References Cited

U.S. PATENT DOCUMENTS

| 11,146,351 | B1* | 10/2021 | Xu | H04B 10/2575 |
|---|---|---|---|---|
| 2002/0012495 | A1* | 1/2002 | Sasai | H04B 10/25754 |
| | | | | 385/24 |
| 2017/0294966 | A1* | 10/2017 | Jia | H04B 10/503 |

* cited by examiner

*Primary Examiner* — David W Lambert
(74) *Attorney, Agent, or Firm* — Armstrong Teasdale LLP

(57) ABSTRACT

A communications network includes a central communication unit, an optical transport medium, and a plurality of remote radio base stations. The central communication unit generates, within a selected millimeter-wave frequency band, a plurality of adjacent two-tone optical frequency conjugate pairs. Each conjugate pair includes a first optical tone carrying a modulated data signal, and a second optical tone carrying a reference local oscillator signal. The optical transport medium transports the plurality of two-tone conjugate pairs to the plurality of radio base stations, and each base station receives at least one conjugate pair at an optical front end thereof. The optical front end separates the first optical tone from the second optical tone, and converts the first optical tone into a millimeter-wave radio frequency electrical signal. The base station further includes a radio antenna system for wirelessly transmitting the millimeter-wave radio frequency electrical signal to at least one wireless receiving device.

11 Claims, 7 Drawing Sheets

PHOTONICS ASSISTED MILLIMETER-WAVE SYSTEMS AND METHODS

CROSS REFERENCE TO RELATED APPLICATIONS

This application is a continuation of U.S. patent application Ser. No. 17/008,548, filed Aug. 31, 2020. U.S. patent application Ser. No. 17/008,548 claims the benefit of and priority to U.S. Provisional Patent Application Ser. No. 62/893,627, filed Aug. 29, 2019, which is incorporated herein by reference in its entirety.

BACKGROUND

The field of the disclosure relates generally to communication networks, and more particularly, to communication networks implementing millimeter wave transmissions.

Conventional communication systems include wired networks (e.g., cable, fiber optic, hybrid fiber coaxial (HFC), etc.) and wireless technologies (e.g., Wi-Fi, Bluetooth, Zigbee, Long Term Evolution (LTE), etc.). Some HFC networks include Wi-Fi and/or small cell LTE base stations within the communication system of the network. However, demand for greater wireless data traffic from cell installations has been increasing at an explosive rate. Accordingly, global mobile data traffic is planned to rapidly scale up in the near future, in response to the recent and ongoing deployment of 5G wireless technology, virtual-reality/augmented-reality enhanced entertainment, and self-driving automobiles. To accommodate the huge capacity requirements for this growing demand, millimeter-wave technologies (sometimes referred to as "mmWave" or "mmW") have been proposed to enable the release a large and significant amount of bandwidth from the wireless spectrum.

That is, microwave and/or millimeter wave technologies have been recognized as a promising solution for high-speed and cost-effective wireless backhaul and relay links in a communications network. In particular, the present evolution from 4G mobile communications to 5G mobile communications has led to a number of proposals to implement millimeter wave technologies into new roles and application scenarios, with many major telecommunication operators and hardware providers developing field trials of 5G communications over millimeter wave bands. The United States Federal Communication Commission (FCC) has also recently announced a 5G FAST plan, and auctions for frequency bands within the 24 GHz and 28 GHz radio frequency (RF) spectra have already begun.

However, the development of many new use cases for the 5G paradigm has also generated a number of significant challenges with respect to network densification and small cells. That is, to realize the higher data rates and area traffic capacities promised by 5G, operators have had to deploy significantly denser network topologies using small cells, in comparison with conventional communication systems that transmit over lower frequency bands (e.g., under 6 GHz). That is, for signal coverage comparable to existing lower-frequency RF systems, mmWave systems require significantly more cells within the same service area. The coverage areas of small cells are typically roughly circular, and for this reason individual small cell base stations must be densely packed within the coverage area to avoid gaps between adjacent small cell coverage areas. Increased cell density therefore creates significant hardware and labor costs to deploy and maintain so many additional stations.

This increase in cell density also gives rise to an additional problem, namely cell edge interference. Each operating cell has a cell edge to its transmission range. With so many more cells densely operating within the same coverage area, the likelihood that an end user is located at a cell edge increases exponentially, thereby requiring a commensurate increase in strategies for interference mitigation and management, which will still further increase the necessary infrastructure and operation expenditures.

Another challenge to realizing a much larger-scale deployment of mmWave transmission systems arises not only from the additional quantity of hardware deployed and operated, but also from the required increase to the quality of the hardware components that operate at the higher frequency bands. More particularly, devices that operate at higher frequencies are typically required to be manufactured according to much stricter tolerances, such as higher precision, clock accuracy, and misalignment tolerance, all of which increase the fabrication cost well beyond that typically required for conventional, lower-frequency systems. Additionally, mmWave propagation loss is generally much larger than the propagation loss seen by conventional centimeter-wave systems. The higher the propagation loss in the system, the higher the required transmitter power and receiver sensitivity to compensate for this additional loss, thereby still further adding the system cost in terms of energy consumption and antenna design.

Accordingly, there is desire in the industry for cable operators to further improve the signal coverage and quality of service by adopting mmWave technologies within both existing and future communication network infrastructures and paradigms, but without experiencing the prohibitive cost, resource, and interference limitations faced by conventional mmWave implementation proposals.

BRIEF SUMMARY

In an embodiment, a communications network includes a central communication unit, an optical transport medium, and a plurality of remote radio base stations. The central communication unit is configured to generate, within a selected millimeter-wave frequency band, a plurality of adjacent two-tone optical frequency conjugate pairs. Each optical frequency conjugate pair includes a first optical tone carrying a modulated data signal, and a second optical tone carrying a reference local oscillator signal. The optical transport medium transports the plurality of two-tone optical frequency conjugate pairs to the plurality of radio base stations, and each base station receives at least one optical frequency conjugate pair at an optical front end thereof. The optical front end separates the first optical tone from the second optical tone, and converts the first optical tone into a millimeter-wave radio frequency electrical signal. The base station further includes a radio antenna system for wirelessly transmitting the millimeter-wave radio frequency electrical signal to at least one wireless receiving device.

In an embodiment, an optical signal processor is provided for processing an aggregated plurality of different conjugate optical signal pairs within a selected millimeter-wave frequency band. Each optical signal pair of the plurality of different conjugate optical signal pairs includes a first optical carrier and a second optical carrier having zero phase difference therebetween. The optical signal processor includes an optical input portion, a spatial light modulator, and an optical output portion. The optical input portion is configured to receive the aggregated plurality of different conjugate optical signal pairs and output a respective plurality of spatially modified optical signal pairs. The spatial light modulator is configured to (i) select, from each respective spatially modified optical signal pair, an information carrier from the first optical carrier and a local oscillator reference carrier from the second carrier, (ii) combine the information carrier and the local oscillator reference carrier into a single optical frequency component for the respective spatially modified optical signal pair, and (iii) introduce a varied phase difference for each respective single optical frequency component. The optical output portion is configured to spatially adapt each of the single optical frequency components for reception by individual photodetectors of a plurality of photodetectors in optical communication with the optical output portion.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
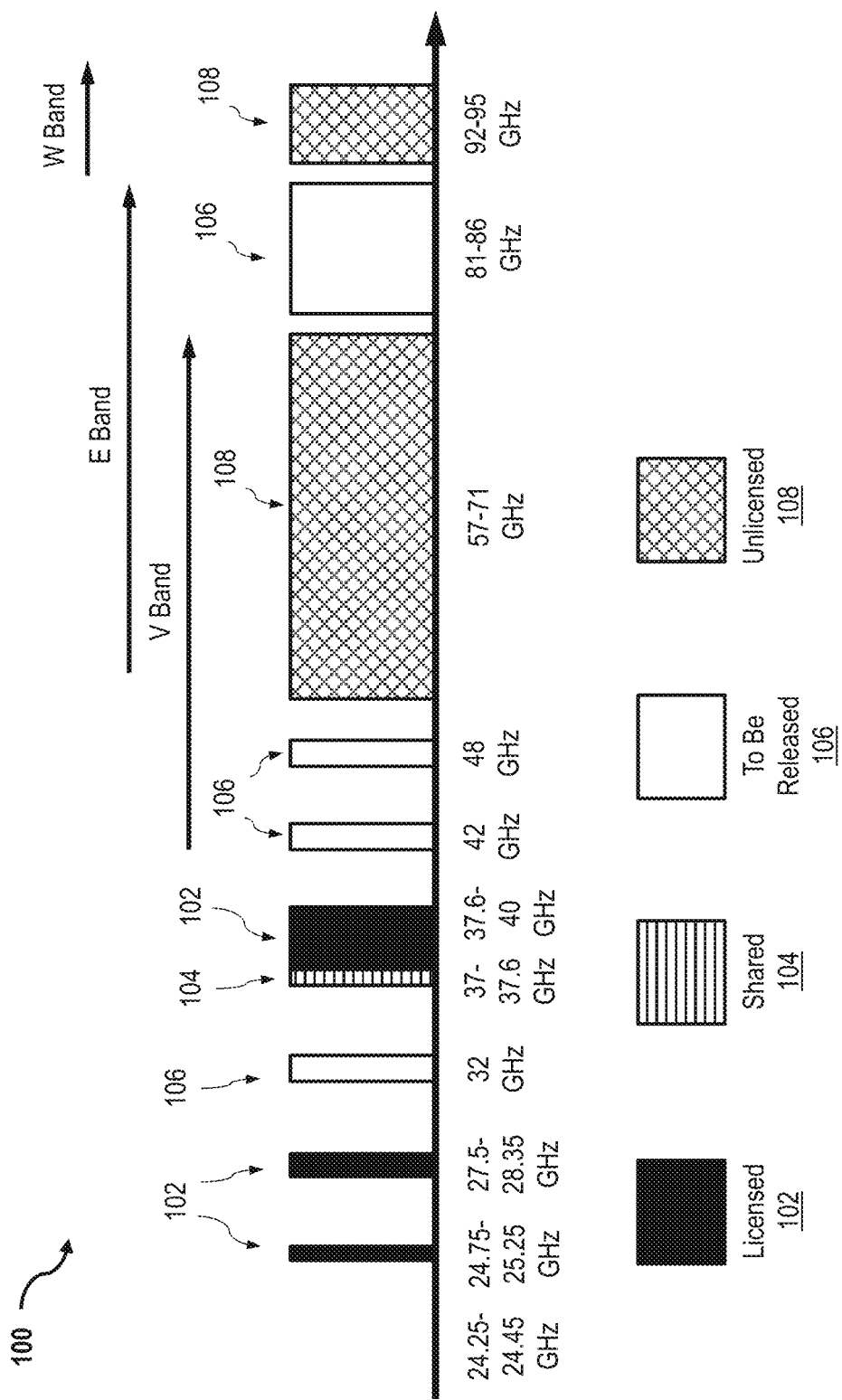
FIG. 1 is a graphical illustration depicting an available millimeter-wave frequency band distribution, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

The word "exemplary" is used herein to mean "serving as an example, instance, or illustration." Any embodiment described herein as "exemplary" is not necessarily to be construed as preferred or advantageous over other embodiments.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As described herein, the phrase "user equipment" includes an electronic device or system utilizing an aggressive, non-cooperative technology protocol, such as LTE-U, and may include one or more of a radio terminal, a cell phone, a laptop computer, a tablet computer, a wearable device, an Internet of Things (IoT) device, and a wireless equipped motor vehicle. The phrase "Wi-Fi device" includes an electronic device, such as a station or STA, which has the capability to use one of the existing 802.11 protocols. For example, a Wi-Fi device can include, without limitation, one or more of a laptop computer, a desktop personal computer (PC), personal digital assistant (PDA), an AP, and a Wi-Fi phone/smartphone. The Wi-Fi device may be fixed, mobile, or portable, and includes a transceiver or transmitter/receiver combination, an 802.11-conformant media access control (MAC) and physical layer (PHY) interface to a wireless medium (WM).

As used herein, the phrase "wireless communication protocol" may refer to one or more cooperative or non-cooperative wireless protocols, including without limitation the 802.11, Wi-Fi, 3G, 4G, 5G, Next Generation (NG), Bluetooth, Zigbee, Long Term Evolution (LTE), and unlicensed LTE (LTE-U) communication protocols.

The following description features systems, components, and processes for photonics assisted mmWave generation and transmission. In an exemplary embodiment, distribution systems and techniques are provided for future ultra-high-speed wireless broadband and fixed wireless access platforms, as well as improvements to conventional platforms.

According to embodiments described herein, innovative deployments of photonic technology improve the distribution of both local oscillator (LO) and reference mmWave signals to distributed radio units. In this manner, phase- and frequency-locked mmWave signals may be provided to the radio units with a significant reduction to the carrier impairments experienced according to conventional techniques. This reduction in carrier impairments thereby further enables significant performance enhancement when implementing additional technologies, including without limitation, coordinated multipoint (CoMP) and/or coordinated beamforming.

In an exemplary embodiment, a fiber-based synchronization and coordination network is established for mmWave communications, which advantageously utilizes multiple distributed low-cost antenna systems in the place of the typical large-scale antenna array of a conventional system, but which effectively emulate the large-scale antenna array at a significantly reduced cost. According to this embodiment, signal coverage and energy efficiency, comparable to a conventional centralized mmWave base station, may be realized in a much more cost-effective manner.

The embodiments described herein further provide innovative photonic components, modules, and devices that significantly improve the flexibility, attenuation, number of antenna elements, and operational bandwidth of mmWave antenna systems. In at least one embodiment, an improved wavelength selective switch (WSS) is integrated with a photonic assisted mmWave integrated circuit to enhance the operational bandwidth of existing and future system components, as well as performance of beamforming where beamforming may be employed at a radio antenna or RF transmitter. In an exemplary embodiment, a significant amount of signal processing, which is conventionally performed in the electrical domain, is advantageously performed in the optical domain.

In the exemplary embodiments described herein, the construction of the various system components is described with respect to tangible hardware elements. The person of ordinary skill in the art, however, will understand that many of the individual elements of the systems and/or apparatuses may be substituted by software modules, or by combinations of hardware and software elements, without departing from the scope herein. Embodiments utilizing network functions virtualization (NFV) and virtualized hardware are also contemplated. In at least one embodiment, the present systems and methods may be configured to implement one or more software packages, including without limitation firmware, resident software, microcode, etc.

As used herein, "millimeter-wave" and "mmWave" refer to radio electro-magnetic waves in the 30-300 GHz frequency range and the 1-10 mm wavelength range, according to conventional usage, and also to the recent expansion of the mmWave concept by the FCC to include the 24 GHz and 28 GHz frequency bands as well. A coarse band allocation plan, consistent with this definition, is illustrated further below with respect to FIG. 1.

FIG. 1 is a graphical illustration depicting an available mmWave frequency band distribution 100. As illustrated in FIG. 1, distribution 100 includes a plurality of licensed bands 102, a shared band 104, and a plurality of to-be-released bands 106 and unlicensed bands 108. It may be observed from distribution 100 that, apart from licensed bands 102 (e.g., about 24 GHz, 28 GHz, and 38 GHz), abundant resources are available within unlicensed bands 108 (e.g., 57-71 GHz and 92-95 GHz). Distribution 100 therefore includes the 64-71 GHz spectrum as an unlicensed band 108, consistent with the recent release by the FCC of this frequency spectrum for unlicensed use, thereby enabling this extended unlicensed band 108 to successfully avoid the atmospheric absorption peak around 60 GHz, thus greatly improving the transmission distance in an outdoor environment.

Distribution 100 also includes, as a portion of the mmWave spectrum applicable to the present embodiments, frequency bands applicable to the 5G New Radio (NR) Release 15 to 16, which expands the 5G NR frequency to 52.6 GHz, and which also proposes (i) band resources up to 114 GHz, and having channels wider than 1 GHz "fiber-like" wireless access transport (FWA), and (ii) enhanced NR-in-unlicensed-bands (NR-U) on the 60-GHz band to enable coexistence between NR and next-generation Wi-Fi (e.g., IEEE 802.11 ad/ax/ay).

As described above, a significant challenge to large-scale deployment of mmWave transmission systems arises from the higher infrastructure and operational costs of mmWave systems. The higher costs for mmWave transmission are due to: (1) increased hardware costs from stricter fabrication requirements relating to component precision, clock accuracy, and misalignment tolerance; and (2) mmWave propagation loss being much larger than conventional centimeter-wave propagation loss. For example, it has been demonstrated that the path loss for a 28 GHz millimeter wave is approximately ten times greater than the path loss for a 2.4 GHz LTE band. Thus, conventional mmWave systems have required higher transmitter power and greater receiver sensitivity to compensate for the increasing propagation loss, both of greatly add to the overall system cost in terms of energy consumption and antenna design.

In particular, applications such as unmanned vehicle operation and rural broadband deployment, and further required beamforming operations to compensate for the signal attenuation, as well as beam steering operations to track moving objects. These systems thus require a significantly larger array of antennas for successful transmission, as well as a commensurate amount of additional electrical hardware components that had been conventionally needed to perform the respective signal processing (e.g., amplifiers, analog-to-digital converters (ADCs), and digital-to-analog converters (DACs)). Nevertheless, there has been a trade-off between this significantly increased hardware cost, on the one hand, and the large increase to the available bandwidth in the mmWave spectrum, on the other hand. That is, one base station transmitting conventional LTE bands, when upgraded to 5G mmWave transmission, may operate approximately 100 times faster, or serve ten times as many subscribers, for the same individual bandwidth. In some conventional implementations, this trade-off has led to a lower cost-per-Hz or cost-per-subscriber.

According to the embodiments described herein, cost-per-Hz and cost-per-subscriber are much more greatly reduced by performing a large quantity of the signal processing the optical domain, as opposed to the conventional signal processing techniques performed in the electrical domain. In an exemplary embodiment, optical processing may be performed using a CMOS-compatible monolithic millimeter-wave integrated circuit (MMIC) or a photonics integrated circuits circuit (PIC). Since an MMIC/PIC configured according to the embodiments described herein may effectively replace a large number of analogous electrical components, the overall hardware cost is greatly reduced using such photonics assisted technology. The hardware cost may be still further reduced as such devices are fabricated on a large scale.

In some embodiments, the present photonics assisted techniques additionally or alternatively implement integrated microwave photonics (MWP), which simultaneously realizes the benefits of both PICs and MMICs. As described herein, such photonic technologies assist some or all of the signal generation, processing, and receiving of microwaves and mmWaves. In at least one embodiment, the present systems and methods further utilize fiber optics to extend the transmission distance, and also to efficiently multiplex or distribute the mmWave signals through the fiber. Exemplary photonics assisted mmWave distribution solutions, and also photonics assisted beamforming solutions, are described further below with respect to FIGS. 2A-7.

Photonics Assisted Distributed Millimeter-Wave Systems

Coordinated multi-point (CoMP) transmission and coordinated beamforming (CB) represent two technical solutions that have been utilized in next-generation (NG) wireless communication systems. 3GPP LTE Release 11 first specified the CoMP downlink transmission schemes, channel status information exchange, reference signal design, and interference detection. Through the coordinated joint transmission techniques defined by this CoMP specification, interference at the mobile network cell edge may be converted to enhance wireless signal strength and to bring significant performance gain to the overall network coverage and radio performance.

CB, on the other hand, is applicable to the high-frequency mmWave signals to address the increased path loss, as well as oxygen/water absorption of millimeter waves. Advanced antenna systems having synchronized antenna arrays for beamforming have been proposed to compensate for this increasing path loss, to extend the transmission distance, and to improve the energy efficiency of the respective mmWave transceivers. Centralized beamforming antenna systems, however, are complex, and require high energy consumption due to the large number of data links, phase-matched transmission lines, power splits, and large-scale data encoding required for system coordination. A comparison between centralized and distributed beamforming techniques is described below with respect to FIGS. 2A-B.

Figure 2B:
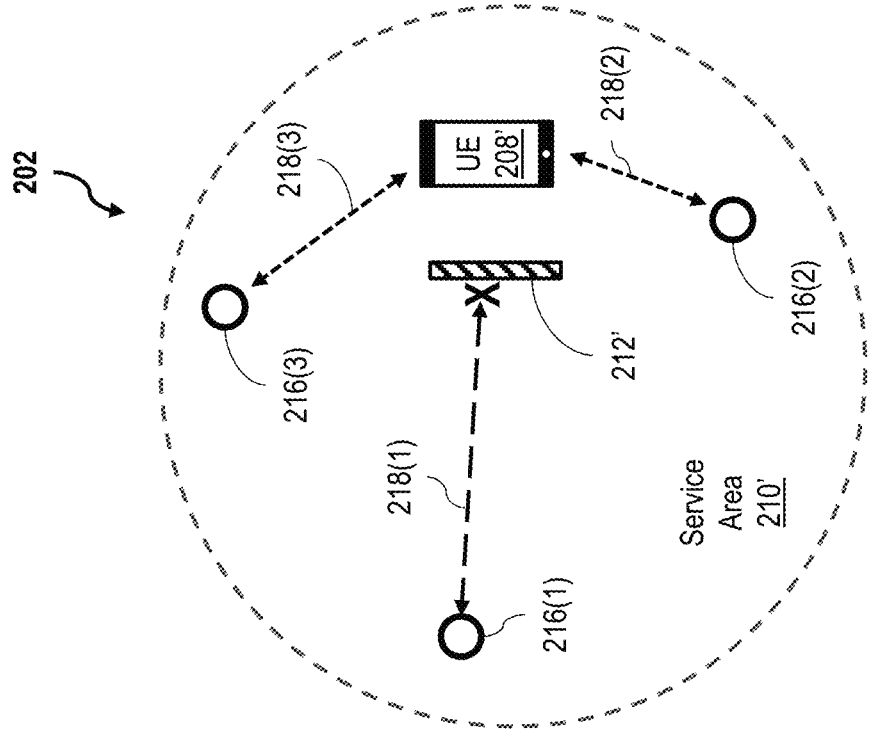
FIG. 2B is a schematic illustration depicting an exemplary distributed antenna system.
Figure 2A:
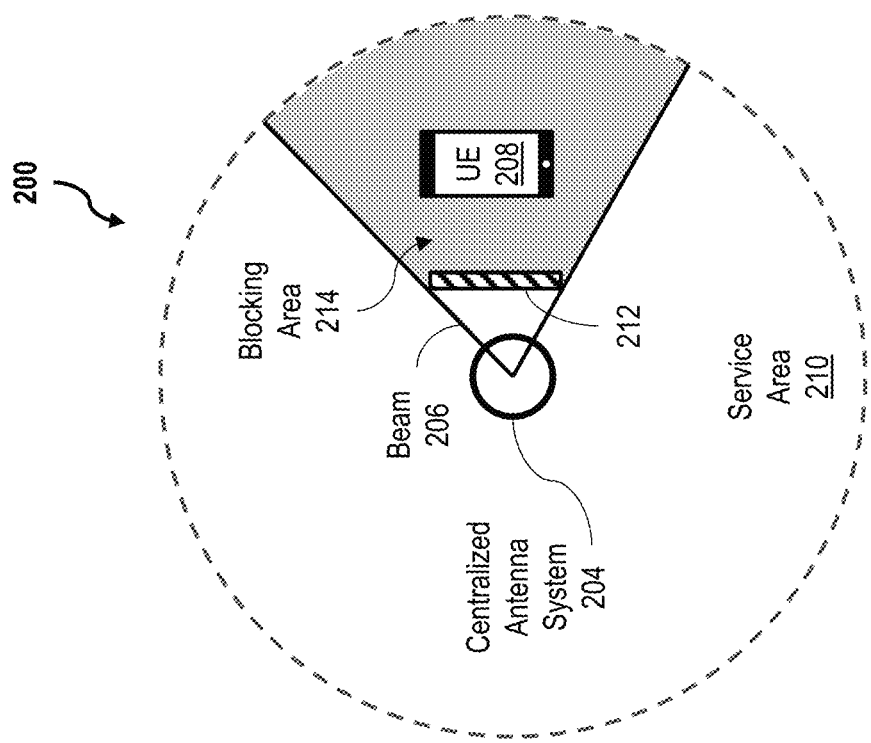
FIG. 2A is a schematic illustration depicting an exemplary centralized antenna system.

FIG. 2A is a schematic illustration depicting an exemplary centralized antenna system 200. FIG. 2B is a schematic illustration depicting an exemplary distributed antenna system 202. Centralized antenna system 200 includes a central transmitting antenna 204 configured to transmit a beamformed transmission signal 206 toward the vicinity of a UE 208 within a service area 210. In this example, an obstruction 212 physically blocks transmission signal 206 from reaching UE 208, thereby forming a blocking area 214 where UE 208 is unable to receive beamformed transmission signal 206. In contrast, distributed antenna system 202 includes a plurality of distributed transmitting antennas 216 within the same service area 210', and which are configured to transmit respective beamformed signals 218 toward the vicinity of UE 208'. In this example, obstruction 212' may still block beamformed transmission signal 218(1) from transmitting antenna 216(1), but UE 208' is nevertheless able to receive beamformed signals 218(2), 218(3) from transmitting antennas 216(2), 216(3), respectively.

A comparison between centralized antenna system 200 and distributed antenna system 202 thus demonstrates the advantages of the distributed antenna system with respect to blocked signals. Given the same service area, the signal in a centralized beamforming system is more likely to be blocked by an obstacle, whereas in a distributed antenna system, even when some of antenna elements are blocked, the data link to a receiving device may still be established with the assistance of other remaining antenna elements. For illustrative purposes, the following mmWave embodiments are described with respect to distributed mmWave communication systems. The person of ordinary skill in the art will understand though, after reading and comprehending the present specification, that these exemplary systems are provided by way of example, and not in a limiting sense.

In an exemplary embodiment, a distributed mmWave system uses a plurality of cost-effective antenna elements (e.g., distributed antennas 216, FIG. 2B) to emulate a centralized antenna array, but at a reduced cost. The distributed antenna elements are coordinated such that greater coverage and energy efficiency is achieved. Nevertheless, conventional distributed antenna systems experience significant challenges with respect to timing synchronization and carrier impairments. For timing synchronization, to achieve coordination among the multiple antennas, the respective jointly-transmitted data streams are synchronized, typically to the symbol level. Such a strict synchronization requires complex bi-directional link control and management, including an exchange between a hub and respective distributed cells the physical-layer channel status, operation, and management information. This exchange is performed with low latency to better guarantee seamless performance.

Carrier impairments, on the other hand, raise different challenges to coordinated beamforming, including such impairments as phase noise and carrier frequency offset (CFO). The impact of phase noise on a coordinated beamforming system are described further below with respect to FIG. 3.

Figure 3:
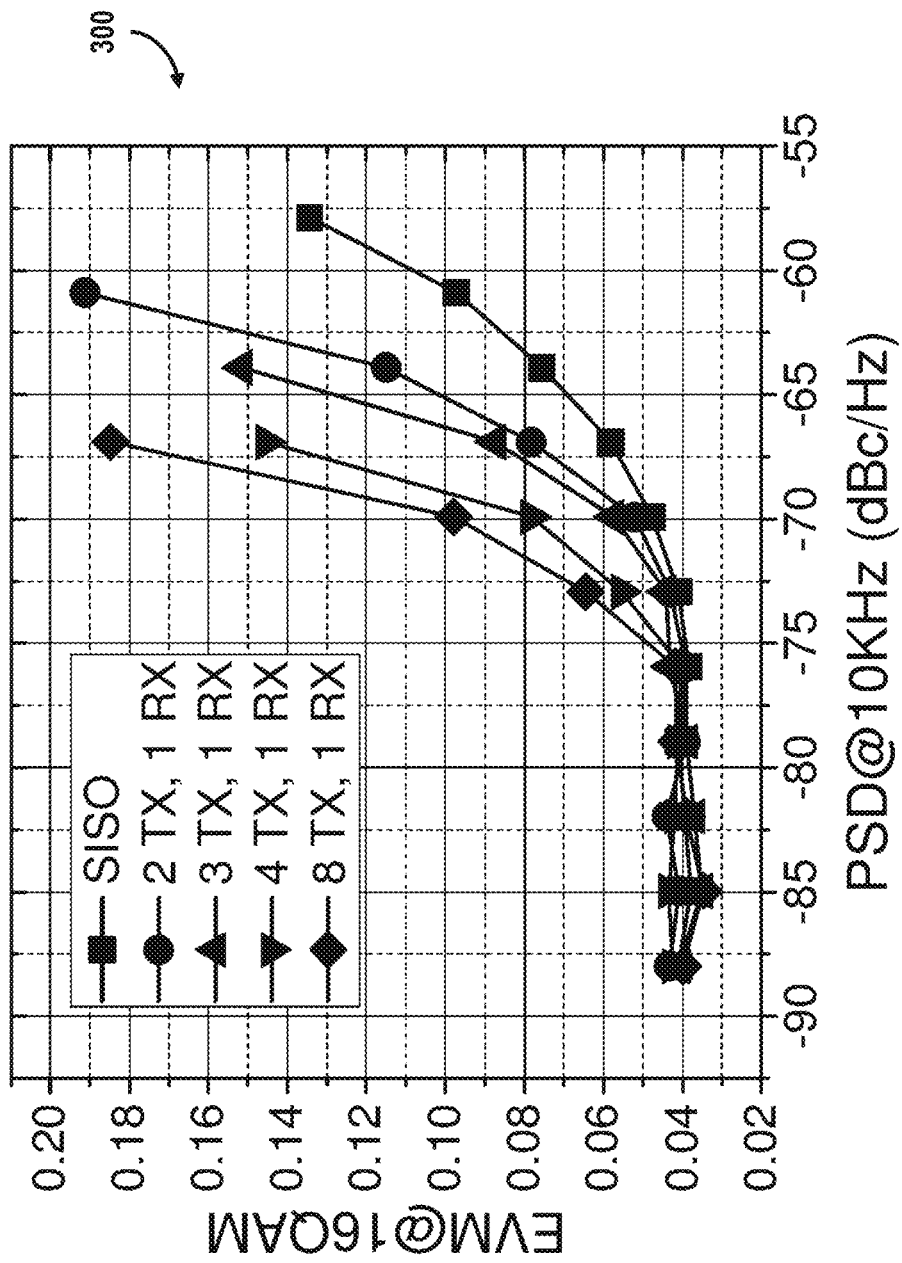
FIG. 3 is a graphical illustration depicting an exemplary plot of simulated signal quality against phase noise for a number of different antenna elements.

FIG. 3 is a graphical illustration depicting an exemplary plot 300 of simulated signal quality against phase noise for a number of different antenna elements. More particularly, plot 300 depicts the simulated signal quality results against phase noise for a beamforming system composed of one or more transmitters (i.e., 1, 2, 3, 4, or 8) transmitting to a single receiver. For these simulated results, the received signal quality is represented by the error vector magnitude (EVM), and the phase noise is represented by the power spectral density (PSD) in dBc/Hz (at 10 kHz, in this example) of uncorrelated phase noise added to the different respective transmitters. That is, the stronger the phase noise, the larger the PSD at 10 kHz.

For this simulation, the signals from the multiple transmitters were 16 QAM signals, and the physical-layer frame structure was adopted according to most recent 5G-NR standards, with a 60 KHz subcarrier spacing and 3300 loaded subcarriers, the total bandwidth of the component carrier being approximately 200 MHz, and the signal-to-noise ratio (SNR) was set at 27 dB. As can be seen from plot 300, the effect of the phase noise impairments become increasingly significant as the number of transmitter antennas is increased from a single transmitter (i.e., a single-input/single-output (SISO) system, up to eight separate transmitters transmitting to a single receiver.

Plot 300 thus demonstrates the general impact of phase noise on a distributed antenna system. For illustrative purposes, it may be noted that the typical PSD at 10 KHz of a 1.8 GHz LO is, for example, approximately −90 dBC/Hz. However, for a 60 GHz mmWave LO, the frequency is multiplied by approximately 20-30 times from a low-frequency reference clock, where the PSD at 10 kHz may degrade to greater than −80 dBc/Hz. Therefore, in a distributed beamforming system operating in the mmWave spectrum, significantly greater impairments will be experienced from phase noise introduced in such a distributed beamforming mmWave system. Additionally, although the CFO is not described with respect to FIG. 3, the present inventors acknowledge that influence of CFO on an mmWave system may also have a greater impact than it would on lower-frequency systems. However, the effects of CFO are generally more difficult to eliminate through digital signal processing (DSP) or other signal processing techniques, and are not further addressed herein.

Figure 4:
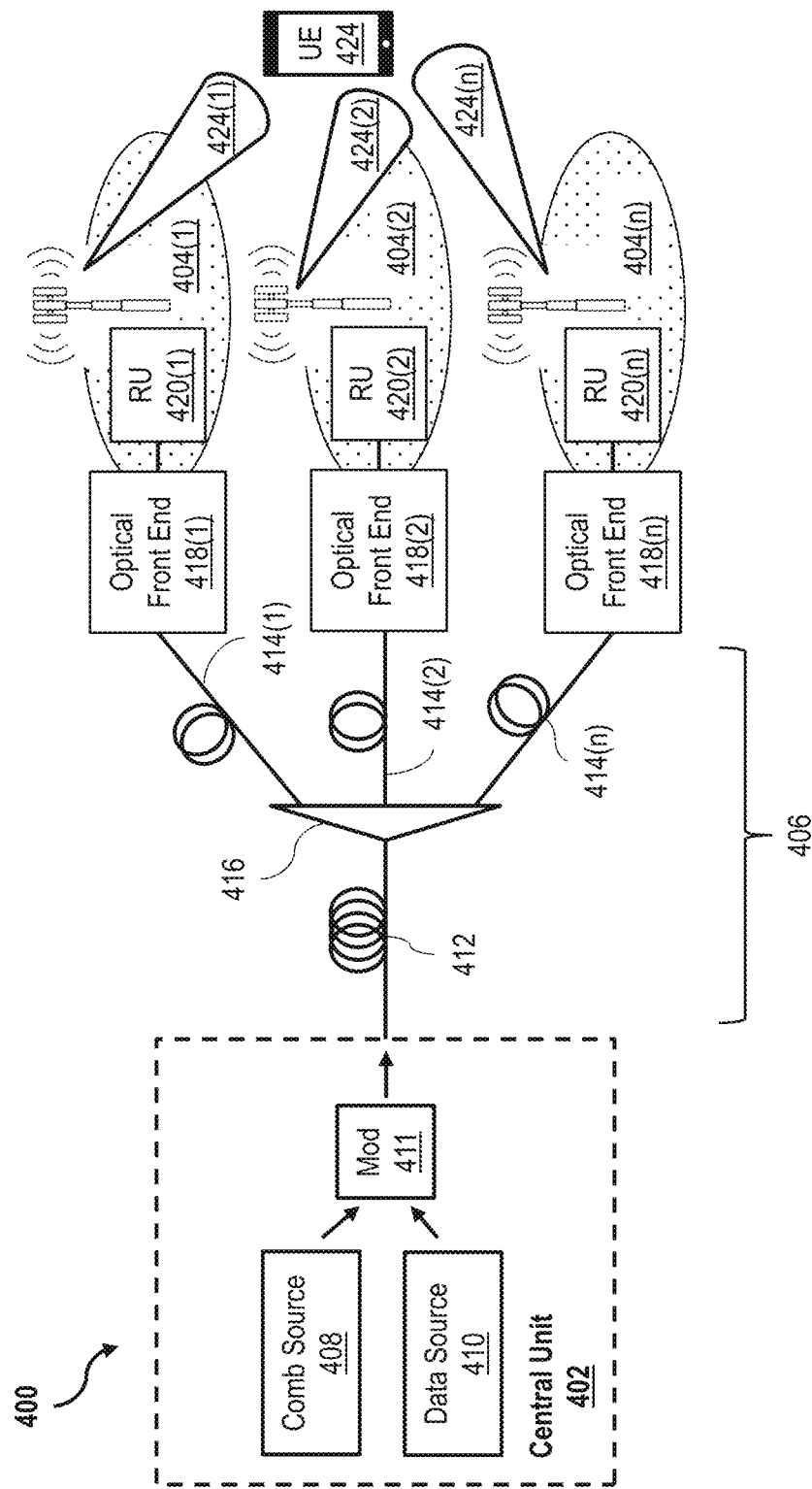
FIG. 4 is a schematic illustration depicting an exemplary communication network architecture, in accordance with an embodiment.

FIG. 4 is a schematic illustration depicting an exemplary communication network architecture 400. In an exemplary embodiment, architecture 400 represents a high-level system diagram for an mmWave fiber communication network. In an exemplary embodiment, architecture 400 includes an upstream central unit 402 in communication with a plurality (i.e., 1-$n$) of base stations 404 over an optical transport medium 406. Upstream central unit 402 may be, for example, a communications hub and/or headend, or a central office, and includes an optical frequency comb source 408, a data source 410, and a modulator 411. Optical transport medium 406 may include a long fiber 412 that is separated into a plurality (i.e., also 1-$n$) of short fibers 414 by a splitter 416. Splitter 416 may include one or more of a wavelength selective switch (WSS), a multiplexer, or an optical device configured to separate and/or combine optical signals. Short fibers 414 are operably coupled to a respective optical front end 418 of a radio unit (RU) 420 of base stations 404, and each of base stations 404 are configured to transmit a respective beamformed signal 422 to one or more UEs 424.

In exemplary operation of architecture 400, optical frequency comb source 408 separates an available mmWave frequency band (not shown in FIG. 4) into a plurality of wavelength channels, and modulator 411 of upstream central unit 402 modulates data packets carrying data and control information, from data source 410, onto the individual respective wavelength channels separated from optical frequency comb source 408. The plurality of modulated wavelength channels may, for example, be aggregated for transmission over long fiber 412, separated into individual modulated wavelength channels at splitter 416, and individually transported over respective short fibers 414 for receipt by respective optical front ends 418 of base stations 414, which may then wirelessly communicate with UEs 424 within their respective RF transmission range. Base stations 404 may each additionally include one or more of a remote radio head/remote radio unit (RRH/RRU), a wireless access base station (e.g., an eNodeB or a gNodeB), and a Wi-Fi access point (AP), and optical front ends 418 may further include an NG interface (not separately shown) configured to receive the optical signals from short fibers 414 according to protocols including one or more of wavelength division multiplexing (WDM), passive optical networks (PONs), Data over Cable Service Interface Specification (DOC SIS), and microwave radio.

In conventional communication networks, mmWave transmission has been particularly challenging because the voltage-controlled oscillators, frequency multipliers, and phase-lock loops under high-frequency bands have contributed to a significant decrease in the quality of the LO signal at the receiving base station. As described above with respect to FIG. 3, the quality of the LO is of even greater significance for mmWave transmissions due to the magnified impact of transceiver impairments induced by the LO. According to the innovative techniques of architecture 400 though, such LO-induced impairments are greatly suppressed, such that the CoMP or CB performance gains realized at lower-frequency transmissions may be effectively realized in architecture 400 for mmWave transmissions.

More particularly, in the exemplary embodiment, architecture 400 utilizes optical frequency comb source 408 to implement mmWave LO delivery across the fiber network to respective base stations 404. In this respect, architecture 400 represents a significant improvement over conventional mmWave communication systems in that the respective LO reference signals used by base stations 404 are generated upstream at central unit 402, and then delivered to the multiple mmWave base stations 404 over optical transport medium 406 (which may be long-distance), rather than being generated by an LO source local to the respective base station 404.

In the exemplary embodiment, optical frequency comb source 408 is a high-quality optical frequency-comb generator deployed at central unit 402, and configured to generate optical two-tone sources for each respective wavelength channels that is modulated for delivery to base stations 404. An exemplary optical frequency comb is described further below with respect to FIGS. 5 and 6. In this example, comb source 408 may generate the two-tone signal pairs according to optical central carrier suppression (OCCS) techniques. In an exemplary embodiment, the optical tones from the frequency comb (or OCCS signal) are coherent signals, sharing the same phase noise and CFO. More particularly, inside a photodetector (not separately shown in FIG. 4) of optical front ends 418, one coherent optical tone of the pair will beat with the conjugate tone of the other of the pair, which will thereby resulting in the cancellation of phase noise and CFO, such that the electrical LO signals, after optical-to-electrical (0/E) conversion at different base stations 404 (e.g., in coordination with photodetectors thereof), are carried by the optical tones and will not be affected by the optical link. Moreover, according to the present embodiments, the O/E converted signals will not inherit the phase noise and CFO from the corresponding light of the laser used to generate the comb source or optical coherence correlation spectroscopy (OCCS) signals at central unit 402. In other embodiments, the present techniques may be implemented with respect to intensity modulated direct detection (IMDD) optical signals.

In further exemplary operation of architecture 400, data packets carrying data and control information are modulated onto the plurality of wavelength channels separated within the respective mmWave band by optical frequency comb source 408. Thus, for each wavelength channels, optical frequency comb source 408 generates a pair of adjacent signals, with one tone of the adjacent signal pair modulated with data signals from data source 410, and the other tone carrying the reference LO signal. The plurality of two-tone signal pairs are then transmitted over fibers 412, 414 and, at respective base stations 404, optical front ends 418 are configured to detect at least one two-tone signal pair for a particular wavelength channel, and then demultiplex the data from the mmWave reference LO. In some embodiments, the mmWave reference LO may be further amplified, and then used for baseband signal up-conversions.

Once separated by respective optical front ends 418, the received modulated mmWave signals may be delivered to the antenna system(s) of the respective base station 404 for wireless transmissions to UEs 424. According to this advantageous configuration of architecture 404, the reference LO signals, which are converted from the optical frequency comb or optical two-tone signals, will be exact copies of the respective mmWave carrier at central unit 402. Accordingly, by implementing a high-quality mmWave source disposed at central unit 402, all of the LO signals received at base stations 404 will be all phase-locked, and have no frequency offset thereby greatly mitigating the carrier impairments experienced by conventional CoMP and CB communication techniques. According to architecture 400, the performance benefits of CoMP and CB may be realized, but without the conventional problems associated therewith.

In an exemplary embodiment, optical frequency comb source 408 is centralized at central unit 402, such that the plurality of wavelength channel signal pairs to base stations 404 are coordinated in time and frequency. In some embodiments, the respective mmWave signal band may be configured such that each two-tone signal pair serves a different respective base station 404. Accordingly, respective beamformed signals 422 may represent wider beams, such as in the case where UE 424 is a plurality of UEs, or narrower beams, such as in the case of a single targeted UE, or a smaller subset of UEs. In some embodiments, beamformed signals 422 may include multiple beams directed toward multiple respective UEs 424. In at least one embodiment, multiple beamformed signals 422 may be targeted to the same UE/UE group 424, but with each beam having different respective pre-coding such that the multiple beamformed signals 422 constructively interfere, that is, additively, at the location of UE 424, at which location the gain of the additive signals is higher.

The advantages realized by a communication system according to architecture 400 become even more apparent in consideration of upcoming 5G and NG wireless local access network (WLAN) proposals using millimeter waves. As described above, these it is important that these near-future deployments reduce cell size while increasing cost-effectiveness. Systems and methods according to architecture 400 therefore represent an achievable solution to deploy multiple distributed radio units for enhanced broadband access to critical areas (e.g., stadiums, conference centers, etc.). As also described above, the increased cell density of these near-future implementations creates significantly more cell edge areas, and thus a commensurate increase in interference. CoMP and CB techniques have been proposed to mitigate such interference effects, but at the cost of added transceiver impairments induced by phase noise and CFO of the LO. The photonics assisted distributed mmWave delivery techniques of architecture 400 successfully suppress such LO-induced impairments by delivering the same LO reference signal together with the data transmission of a wavelength channel in a coordinated two-tone signal pair.

According to the embodiment depicted in FIG. 4, because the LO reference signal is delivered optically, the challenges presented by conventional local voltage-controlled oscillators are avoided for an mmWave communication system. The present utilization of an optical frequency comb, in cooperation with an existing fiber (e.g., of a cable network operator), provides a cost-effective solution to deliver a high-quality mmWave LO and/or clock reference that further enables synchronization of the respective frequencies and phases of distributed radio access units (e.g., base stations 404). The delivered phase-locked LO signals enable the communication system to minimize the transceiver impairments experienced using conventional techniques, while also greatly simplifying the signal recovery processing at the end receivers, thereby optimizing the performance of additional CoMP or CB operations by the radio access units.

Although architecture 400 is described with respect to 5G and/or NR networks, this description is provided by way of example, and not in a limiting sense. The person of ordinary skill the art will understand that the innovative principles described herein are applicable to other mmWave communication networks, such as 4G and/or LTE networks. The present embodiments therefore provide an improved financial model for denser cell deployments at higher frequency bands, and a significantly less-expensive alternative to conventional cell deployment proposals that employ CB or CoMP. Systems and methods according to architecture 400, for example, greatly enhance the capabilities of network operators to increase network capacity and coverage infill, and particularly with respect to residential and urban scenarios, and which may be advantageously deployed in a complementary fashion alongside conventional network architectures.

Optical mmWave Comb Generation

As discussed above, innovative solutions for optical mmWave generation and transmission utilize an optical frequency comb source (e.g., element 408) for LO delivery over the fiber network. In an exemplary embodiment, an optical frequency comb source may be configured to implement an optical frequency comb generator, as described further below with respect to FIGS. 5 and 6.

Figure 5:
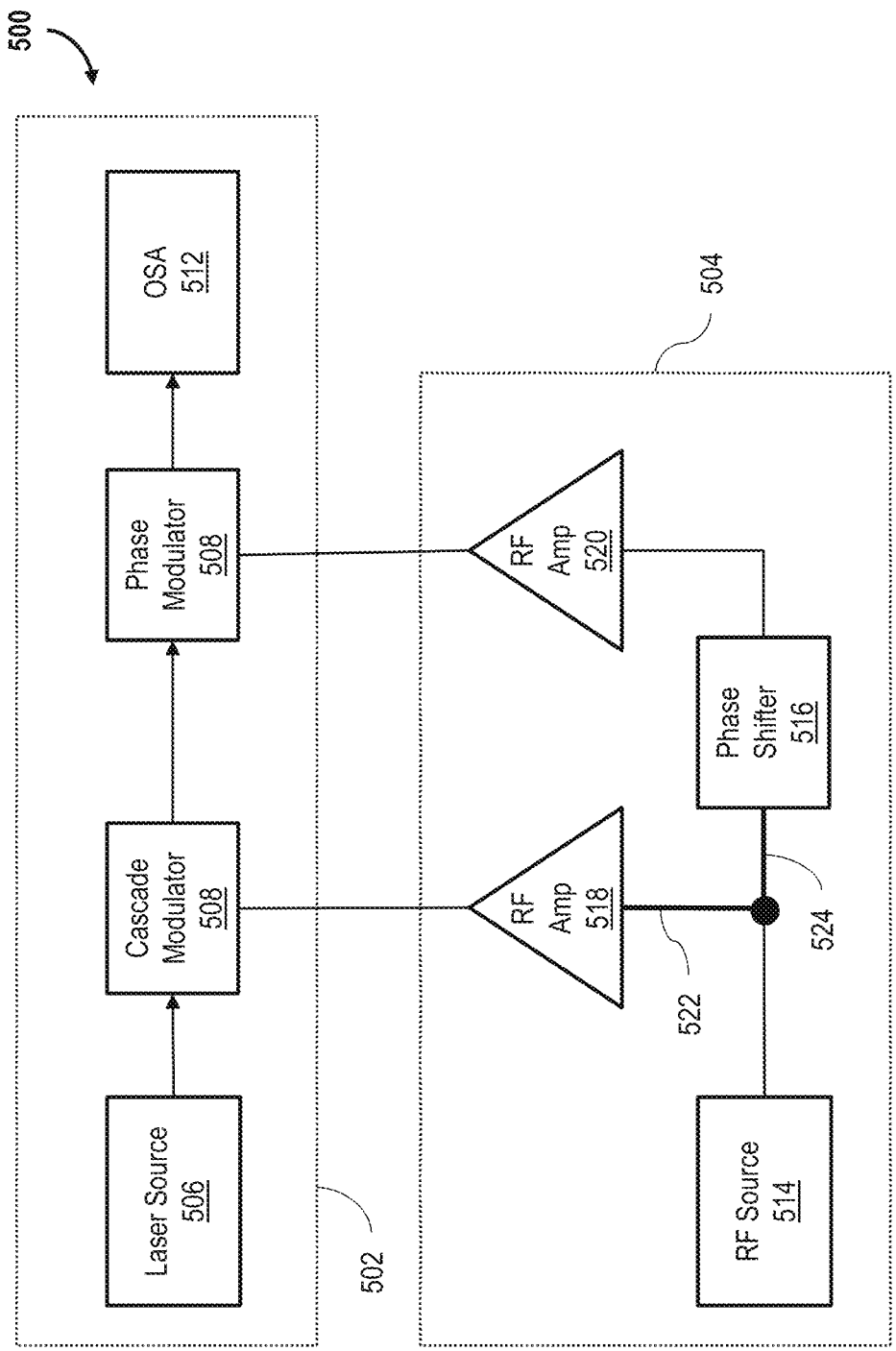
FIG. 5 is a block diagram schematic illustration depicting an exemplary depicting an exemplary optical frequency comb generator.

FIG. 5 is a block diagram schematic illustration depicting an exemplary optical frequency comb generator 500. In an exemplary embodiment, comb generator 500 includes an optical portion 502, and an electrical portion 504. Optical portion 502 may include one or more of a laser source 506, a cascade modulator 508, a phase modulator (PM) 510, and an optical spectrum analyzer (OSA) 512. Laser source 506 may include, for example, an external cavity laser (ECL), and cascade modulator 508 may be a cascaded Mach-Zender modulator (MZM). Electrical portion 504 may include one or of an RF source 514, a phase shifter 516, a first RF amplifier 518, and a second RF amplifier 520.

In exemplary operation of comb generator 500, RF source 514 functions to provide an accurate frequency reference for the respective optical carriers in the comb. In an exemplary embodiment, the frequency reference of RF source 514 is configured to correspond to a minimum frequency separation between the two adjacent optical carriers in the comb that constitute a respective two-tone mmWave signal pair that individually deliver the modulated data signal and the reference LO over the fiber network. In further operation of comb generator 500, the electrical RF signal from RF source 514 is separated into (i) a first RF signal portion 522, which is used, after application by first RF amplifier 518, to modulate cascade modulator 508, and (ii) a second RF signal portion 524, which is fed, after amplification by second RF amplifier 520, into a phase modulator 510. In an embodiment, phase shifter 516 is disposed along the path of second RF signal portion 524, and prior to input to second RF amplifier 520, to ensure that first and second RF signal portions 522, 524 are phase matched. Alternatively, phase shifter 516 may be disposed in the path of first RF signal portion 522.

This phase matching between the separate RF signal branches thereby advantageously enables comb generator 500 a greater quantity of separate frequency tones within the same signal band, and a comb shape exhibiting substantially improved flatness for a substantial quantity of the generated tones, as illustrated further below with respect to FIG. 6. Optical spectrum analyzer 512 is thus configured to monitor the generated optical comb, which is output in frequency domain from phase modulator 510.

Figure 6:
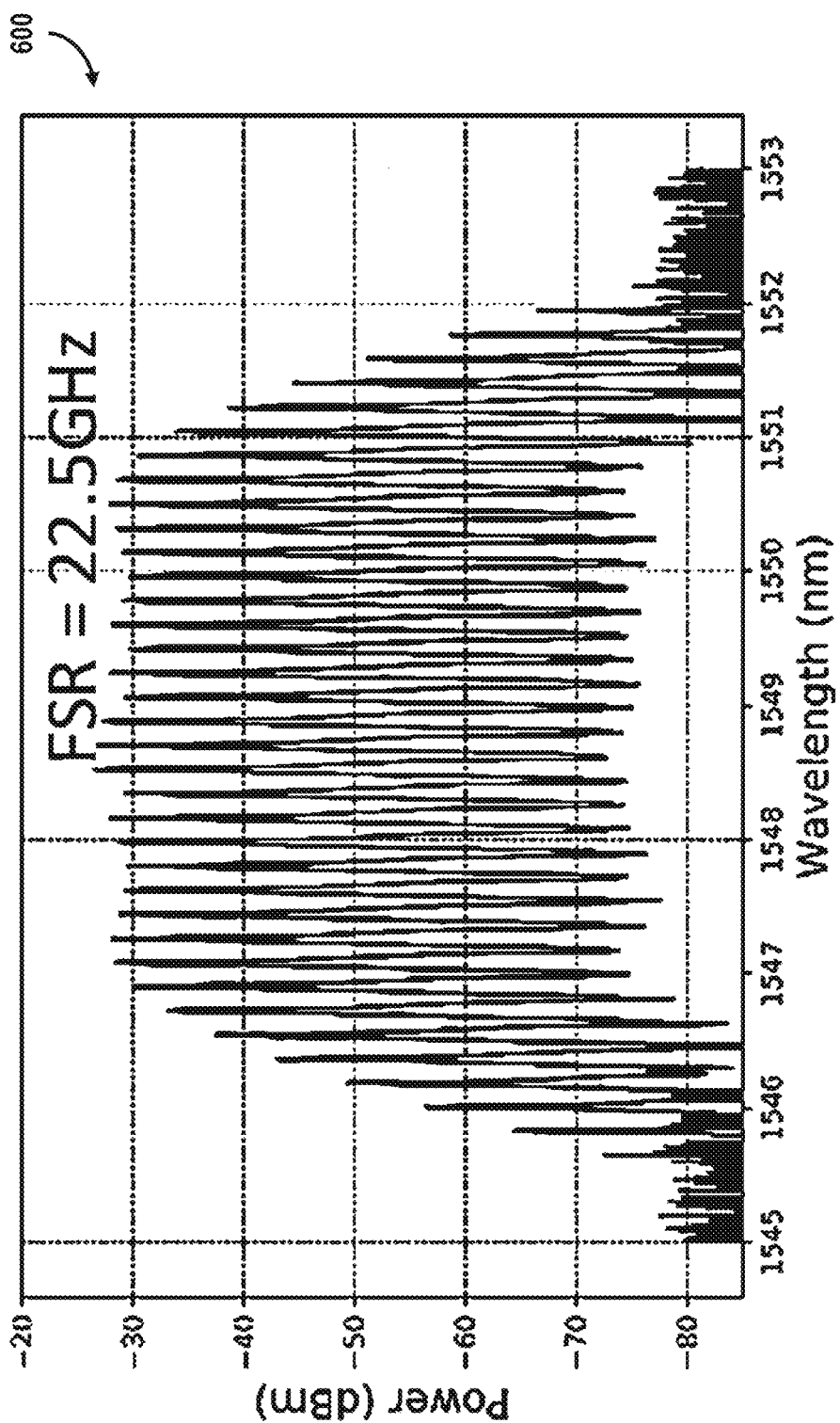
FIG. 6 is a graphical illustration depicting an exemplary measured optical spectrum output from the optical frequency comb generator depicted in FIG. 5.

FIG. 6 is a graphical illustration depicting a plot 600 of an exemplary measured optical spectrum output from optical frequency comb generator 500, FIG. 5. In the exemplary embodiment depicted in FIG. 5, plot 600 illustrates a measured optical spectrum including 23 optical tones having a minimal separation, or free spectral range (FSR), of 22.5 GHz, (i.e., FSR=22.5 GHz). In an exemplary embodiment, the frequency separation of the individual 23 optical tones may be set according to the desired target signal(s), and the separation distance between the adjacent tones may determine the "harmonics" of the comb. As also described above with respect to FIG. 5, the measured optical power in plot 600 exhibits a substantial flatness for a substantial majority of the 23 optical tones.

The spectral range and comb density of plot 600 is provided for purposes of illustration, and is not intended to be limiting. The person of ordinary skill in the art will understand that the spectral range may be larger, and/or the comb density may be higher, according to the available spectral band and FSR requirements of the particular network. In the exemplary embodiment, plot 600 further demonstrates how every optical carrier inside the single frequency comb shares the same properties with respect to phase noise and CFO; the relative frequency differences and phases are strictly locked between the optical carriers. Optical frequency comb generator 500 therefore provides at least one effective solution that may be included with optical frequency comb source 408, FIG. 4.

Photonics Assisted Beamforming

Recent developments in photonic technologies also may be integrated with one or of the embodiments described herein to assist operations for mmWave beamforming (e.g., at base stations 404, FIG. 4). For example, signal processing of the detected optical signal may be performed in the optical domain, as opposed to the conventional techniques of processing a converted signal in the electrical domain, using a wavelength selective switch (WSS). In an exemplary embodiment, the WSS may include a resonator-based silicon ring.

As described further below with respect to FIG. 7, a WSS may be based on a liquid crystal on silicon (LCoS) platform to effectively additional photonics assisted technologies to further assist the mmWave beamforming operations described herein. Through the utilization of such photonic devices for mmWave generation, delivery, filtering, and phase shifting, the present embodiments advantageously integrate photonic and millimeter-wave circuits as an effective solution to reduce attenuation, improve tunability, and increase both the bandwidth and transmission distance of an mmWave system (e.g., architecture 400, FIG. 4). In an exemplary embodiment, an LCoS-based WSS is applied to an mmWave antenna system (e.g., one or of base stations 404, FIG. 4) to constitute a WSS-assisted mmWave beamforming antenna system. In at least some embodiments, the LCoS-based WSS is implemented with respect to an NG fiber switching node with one reconfigurable optical add-drop multiplexers (ROADMs).

In the exemplary embodiment, the LCoS-based WSS is implemented for an mmWave/microwave photonic system to enable flexible adjustment the number of wavelength channels, and to more easily tune the bandwidth of each such wavelength channel for each output port of the destination beamforming antenna. An LCoS-based WSS further enables an optical receiver to phase-shift the detected light spectrum of each channel, and with the further capability to reconfigure the filter shape, bandwidth, and phase shift of the light on different wavelengths. An operational principle of an exemplary WSS assisted mmWave beamformer is described further below with respect to FIG. 7.

Figure 7:
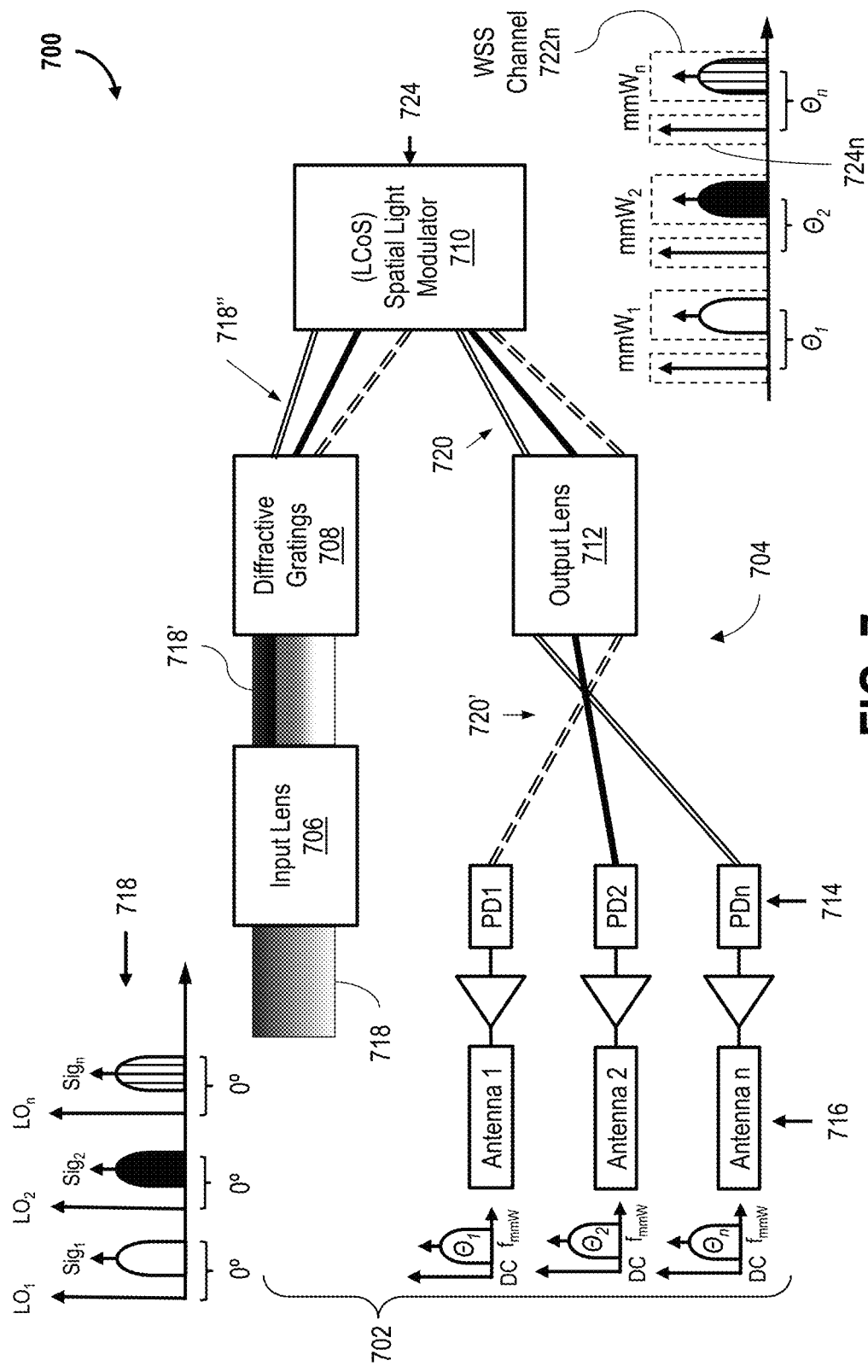
FIG. 7 is a schematic illustration depicting an operational principle of an exemplary receiver system.

FIG. 7 is a schematic illustration depicting an operational principle for an exemplary receiver system 700. In an exemplary embodiment, receiver system 700 is configured to enhance beamforming capabilities of a CB or CoMP antenna system or array, and includes a photonics-assisted radio unit 702 and an optical front end 704. In the exemplary embodiment, optical front end 704 includes one or more of an input lens 706, diffractive gratings 708, a spatial light modulator 710, and an output lens 712 in optical communication with a plurality (i.e., 1-$n$) of photodetectors 714 of receiver system 700. In this example, each of photodetectors 714 is configured to electrically communicate with a respective antenna or antenna subsystem 716, and therefore represent respective output ports for optical front end 704. In the exemplary embodiment, spatial light modulator 710 includes an LCoS-based WSS.

In exemplary operation of receiver system 700, a plurality of different optical signal pairs 718 is received at input lens 706 of optical front end 704. The plurality of different optical signal pairs 718 may, for example, represent an aggregation of two-tone mmWave wavelength channels from an optical frequency comb generator source (e.g., comb source 408, FIG. 4, or comb generator 500, FIG. 5), or a grouping of single-side-band optical mmWave signals. Each of optical signal pairs 718 thus includes one light signal carrying modulated data, and another light signal (i.e., the sideband) used for the reference LO. For each optical mmWave signal of the optical signal pairs 718, because each pair of modulated data and reference LO lights signals is generated from the same optical transmitter (e.g., central unit 402, FIG. 4), the initial phase difference is zero between the signals of each pair.

In further exemplary operation of receiver system 700, input lens 706 and diffractive gratings 708 represent successive adaptation stages for spatially modifying the input signal pairs 718, such that the respective different wavelengths thereof may be first focused by input lens 706, then separated by diffractive gratings 708, and then enter into LCoS-based spatial light modulator 710. Spatial light modulator 710 may then function to re-combine each of the individually paired data/LO signals into one optical beam, and then program the phase thereof for each of a plurality of optical frequency components 720 output therefrom. Accordingly, spatial light modulator 710 functions to change the phase and amplitude of each optical signal, similarly to the functioning of electrical signal processor in a conventional system, but without requiring any active electrical elements to perform the analogous signal processing in the optical domain. That is, an LCoS-based WSS may include some active elements, but only for some control functions of the component, and not for processing or changing the optical signal processed therethrough.

Spatial light modulator 700 thus advantageously enables, in the optical domain, phase and amplitude manipulation of the spatially-modified signal pairs 718" to select the data information carrier 722 of the respective signal pair 718 from the reference LO carrier 722 of the same pair 718". More particularly, from spatial light modulator 710, the different optical mmWave signal 718 are spatially separated into different respective optical beams 722, 724, and a varied phase difference θ may be introduced for each such beam pair by programming the phase of the different wavelengths in the LCoS for optical frequency components 720. In an exemplary embodiment, the LCoS-based WSS includes an input control 726 enabling programming of the IC portion thereof to modify the respective phase, amplitude, and delay for each wavelength/wavelength pair 718 received by optical front end 704, such that the output beams from spatial light modulator 710 may be easily shaped and steered to the desired target ports therefore (i.e., photodetectors 714). Input control 726 of the LCoS may thus be configured to be agile, and provide fast commands in real-time, using local intelligence (e.g., a monitoring capability within receiver system 700 or spatial light modulator 710) and/or based on signals from a remote hub (e.g., central unit 402, FIG. 4)

The respective optical beams output from spatial light modulator 710 are then passed through output lens 712, which is configured to adapt the output optical beams to the physical environment necessary to transport the output beams to respective individual photodetectors 714. In an exemplary embodiment, the plurality of photodetectors 714 may constitute a photodetector array. Once received by the array of photodetectors 714, the respective optical light beams are beat into electrical mmWave signals with different phase shifts, i.e., phase shifts introduced by spatial light modulator 710. In an exemplary embodiment, the phase-shifted beams are coded for beamforming by respective antennas 716. In the exemplary embodiment, the plurality of antennas 716 represent different antenna elements (i.e., 1-$n$ antennas) of a phase-array antenna disposed within a single base station (e.g., base station 404, FIG. 4). In this example, implementation of the LCoS-based WSS of spatial light modulator 710 advantageously enables a single base station to efficiently employ CB and/or CoMP operations for a considerable plurality of mmWave wavelength channels, but without suffering from the significant LO-induced impairments conventionally experienced at higher transmission frequencies.

In at least one embodiment, one or more of antennas 716 are spatially separated among different base stations, where individual antennas 716 are configured for electrical communication with respective photodetectors 714 disposed in close proximity to the remote spatial light modulator 710. In this example, the LCoS-based WSS of spatial light modulator 710 functions as a central optical processor, or optical switching/steering mechanism, for distribution of multiple mmWave wavelengths to a plurality of remote antennas/base stations for CB or CoMP.

The WSS-based beamforming techniques of the present embodiments provide a number of significant advantages in comparison with conventional techniques. For example, in comparison with a conventional electronic device having a high-ratio splitter used to separate the electrical signal into different branches of phase shifters, the WSS-based beamforming experiences significantly reduced insertion loss. Additionally, and also in comparison with electrical phase shifters and attenuators, and LCoS-based spatial light modulator (e.g., spatial light modulator 710) exhibits an ultrabroad operational bandwidth, a much larger phase-tunable range, the lower insertion loss described immediately above, and the flexibility to operate for the considerable number of different mmWave frequencies.

FCC policy support, along with more new bandwidth resources released in the past few years at 24 GHz, 28 GHz, and 64-71 GHz, research, development, and investment of mmWave technologies has been intensifying, and particularly with respect to the 5G mobile paradigm. A number of domestic telecommunications operators have been conducting 5G field trials and wireless deployments, including substantially large 5G fixed wireless trials. Nevertheless, large-scale deployment of mmWave systems is still hampered by the conventional limitations and impairments described above. Systems and methods according to the embodiments described herein though, provide a number of solutions that enable mmWave-based data transmission to be successfully realized the considerably more cost-effective basis.

The present embodiments are therefore advantageous to particular scenarios where it is preferable to utilize mmWave technologies. For example, dense urban deployment scenarios, as well as co-siting events with 5G NR mmWave antennas (e.g., using existing cellular LTE infrastructures), may be a particularly cost-effective pathway to achieve both wider coverage and superior performance in high-population locations. Moreover, in suburban and rural areas, where fiber or cable deployment is known to be particularly challenging, mmWave transmission may nevertheless still provide a more reliable and ultra-fast backhaul or fixed wireless link to the suburban/rural subscribers. As described herein, delivery of both the relevant data and LO signals may originate at a distant central office, and be optically transported over long distance fibers prior to being converted into wireless signals received wirelessly by local user devices. Accordingly, the necessary infrastructure is already in place to easily scale the cell density at such suburban/rural locations as the number of wireless subscribers and devices increases over time.

Existing field trials and research have already demonstrated the value of mmWave transmission or dense venue deployments as well, such as in the case of convention centers, musical concert arenas, and indoor/outdoor stadiums. There is also a desire expressed in the industry to achieve similar favorable performance for indoor businesses and enterprises having low mobility, such as office buildings, shopping centers, and subway stations, to name but a few. The recent 5G NR Release 15 and 16 specifically proposed new mmWave applications and services, including "fiber like" fixed wireless access (FWA) for ultra-high-speed broadband access on the 70-80 GHz bands, and integrated access and backhaul (TAB) beyond the 52.6 GHz band to both expand the reach of the fiber nodes, and also to relay high-throughput traffic. All of these proposed mmWave applications may be achieved in a more cost-effective manner according to the embodiments described herein.

According to the innovative techniques described herein, photonics assisted mmWave generation and distribution systems are provided for future ultra-high-speed wireless broadband and FWA platforms. The present systems and methods are further useful to improve and upgrade existing wireless platforms by efficiently enabling the generation, transport, and optical processing of mmWave signals over existing lower-frequency fiber networks. The embodiments described herein may therefore represent a standalone communication network implementing one or the photonics assisted technologies described above, such as mmWave optical frequency comb source 408, FIG. 4, optical frequency comb generator 500, FIG. 5, and/or the LCoS-based WSS of spatial light modulator 710 and receiver system 700, FIG. 7. Alternatively, one of the individual embodiments described above may be implemented to supplement an existing fiber infrastructure as a complementary subsystem.

According to the present embodiments, photonic technologies improve upon mmWave communication systems by: (1) assisting the fiber networks in distributing mmWave reference LO signals to distributed radio units as phase- and frequency-locked mmWave signals, which thereby enable significant reduction to carrier impairments, which thus greatly enhance the performance of CoMP or CB operations at the radio units; (2) emulating a large-scale antenna array, through deployment of a fiber-based synchronization and coordination network, using multiple distributed relatively low-cost antenna systems that nevertheless improve the signal coverage and energy efficiency comparable to the conventional centralized mmWave base stations; and (3) integrating particular photonic devices, such as a WSS, with future photonic mmWave integrated circuits to improve the flexibility, attenuation, number of antenna elements, and operational bandwidth of mmWave antenna systems, while also further enhancing the performance of beamforming operations performed by such antenna systems. Systems and methods according to the present embodiments thus enable a real-time phase-shifting optical signal processor that may be readily scaled to a significantly larger number of mmWave signal bands, as more and more of the mmWave spectrum is released for use.

Some of the above embodiments are described with respect to some particular mmWave bands. Such examples are provided by way of explanation, and not in a limiting sense. Other frequency bands are contemplated that do not depart from the scope of the embodiments herein. For example, the person of ordinary skill in the art would not be motivated to deploy the two-tone signal techniques of the present embodiments to a lower frequency communication system, since the carrier impairments described above are not generally considered such a challenge at the lower broadcast frequency transmissions (e.g., 6 GHz and below). Additionally, at such lower wavelength channels, there is no need to have a second signal tone for such low frequency signals, where the data signal itself may be easily modulated without the need for, or a particular benefit from, an additional phase-locked tone of a two-tone pair, or as an additional side-band to the low-frequency data signal.

Exemplary embodiments of systems and methods for photonics assisted mmWave networks and communication techniques are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A central communication unit for a communications network configured for transmission to a plurality of remote radio base stations over an optical communication medium, comprising:
    a processor in operable communication with the optical communication medium; and
    a memory device in operable communication with the processor and configured to store computer-executable instructions, which, when executed by the processor, cause the central communication unit to:
        generate, within a selected millimeter-wave frequency band, a plurality of adjacent two-tone optical frequency conjugate pairs, wherein each optical frequency conjugate pair includes (i) a first optical tone carrying a modulated data signal, and iii) a second optical tone carrying a reference local oscillator (LO) signal, wherein the second optical tone is phase-locked and frequency-locked to the first optical tone; and
        output the plurality of adjacent two-tone optical frequency conjugate pairs to the optical transport medium for delivery to at least one base station of the plurality of base stations such that the at least one base station is enabled to (i) separate the first optical tone from the second optical tone of a first optical frequency conjugate pair of the plurality of adjacent two-tone optical frequency conjugate pairs, and (ii) convert the first optical tone of the first optical frequency conjugate pair into a millimeter-wave radio frequency (RF) electrical signal
    wherein the phase-locked first and second optical tones beat against one another, at the optical front end, to cancel at least one of induced phase noise and carrier frequency offset.

2. The central communication unit of claim 1, further comprising (i) an optical frequency comb source configured to generate, within the selected millimeter-wave frequency band, at least one separate optical wavelength channel for each optical frequency conjugate pair, (ii) a data source configured to generate a plurality of data packets, and (iii) a modulator configured to modulate, for each generated separate optical wavelength channel, respective data packets of the plurality of data packets onto the first optical tone corresponding to a particular separate optical wavelength channel.

3. The central communication unit of claim 2, wherein the optical frequency comb source is further configured to separate the plurality of adjacent two-tone optical frequency conjugate pairs by a consistent free spectral range within the selected millimeter-wave frequency band.

4. The central communication unit of claim 2, wherein the optical frequency comb source is configured to generate a majority of the separate optical wavelength channels within the selected millimeter-wave frequency band at a substantially equal optical power level.

5. The central communication unit of claim 2, wherein the optical frequency comb source is configured to generate each respective conjugate pair of the first and second optical tones such that (i) the first optical tone corresponds to the optical wavelength channel of a particular conjugate pair, and (ii) the second optical tone comprises a side-band of the first optical tone.

6. The central communication unit of claim 1, wherein the instructions further cause the central communication unit to aggregate the plurality of adjacent two-tone optical frequency conjugate pairs for simultaneous transmission over the optical transport medium.

7. The central communication unit of claim 6, wherein the aggregated plurality of adjacent two-tone optical frequency conjugate pairs are configured for a splitter disposed along the optical communication medium to optically separate the aggregated plurality of adjacent two-tone optical frequency conjugate pairs into individual optical pairs of the at least one optical frequency conjugate pairs.

8. An optical signal processor, comprising:
   a spatial light modulator configured to (i) receive an aggregated plurality of conjugate optical signal pairs, (ii) modify the received aggregated plurality of conjugate optical signal pairs into a respective plurality of spatially modified optical signal pairs, (iii) select, from each respective spatially modified optical signal pair, an information carrier and a local oscillator reference carrier;
   a combiner configured to combine the information carrier and the local oscillator reference carrier into a single optical frequency component for each respective spatially modified optical signal pair; and
   an adapter configured to (i) introduce a varied phase difference for each respective single optical frequency component, and (ii) spatially adapt each of the single optical frequency components for reception by individual photodetectors of a plurality of photodetectors in optical communication with the optical signal processor,
   wherein a phase difference between the information carrier and the local oscillator reference carrier is zero.

9. The optical signal processor of claim 8, wherein the spatial light modulator is further configured to code each of the single optical frequency components to enable at least one of coordinated beamforming and coordinated multipoint operation by one or more antenna elements respectively disposed in proximity to the plurality of photodetectors.

10. The optical signal processor of claim 8, wherein the spatial light modulator comprises (i) an input control, and (ii) a liquid crystal on silicon platform including an integrated circuit programmable from the input control.

11. The optical signal processor of claim 10, wherein the spatial light modulator further comprises a wavelength selective switch.

* * * * *